(12) United States Patent
Kim

(10) Patent No.: US 8,572,652 B2
(45) Date of Patent: Oct. 29, 2013

(54) APPARATUS AND METHOD FOR DISPLAYING CHANNEL INFORMATION IN DIGITAL BROADCASTING RECEIVER

(75) Inventor: Byoung-Geun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 12/338,231

(22) Filed: Dec. 18, 2008

(65) Prior Publication Data

US 2009/0205009 A1 Aug. 13, 2009

(30) Foreign Application Priority Data

Feb. 13, 2008 (KR) ........................ 10-2008-0013063

(51) Int. Cl.
*G06F 3/00* (2006.01)
*G06F 13/00* (2006.01)
*H04N 5/445* (2011.01)

(52) U.S. Cl.
USPC .................. 725/43; 725/38; 725/39; 725/40; 725/41; 725/54; 725/151

(58) Field of Classification Search
USPC ........... 725/38–41, 43, 54, 56, 131, 139, 151; 348/564
See application file for complete search history.

(56) References Cited

U.S. PATENT DOCUMENTS

| | | | |
|---|---|---|---|
| 5,398,074 A * | 3/1995 | Duffield et al. ................ | 348/564 |
| 5,506,628 A * | 4/1996 | Chun ............................ | 348/565 |
| 5,559,550 A * | 9/1996 | Mankovitz ....................... | 725/41 |
| 6,118,493 A | 9/2000 | Duhault et al. | |
| 6,147,714 A * | 11/2000 | Terasawa et al. .............. | 348/564 |
| 6,405,371 B1 * | 6/2002 | Oosterhout et al. ............. | 725/39 |
| 6,522,347 B1 * | 2/2003 | Tsuji et al. .................... | 715/848 |
| 6,714,264 B1 * | 3/2004 | Kempisty ....................... | 348/732 |
| 6,804,824 B1 | 10/2004 | Potrebic et al. | |
| 7,373,650 B1 * | 5/2008 | Rodriguez et al. .............. | 725/41 |
| 7,757,252 B1 * | 7/2010 | Agasse ............................ | 725/41 |
| 7,818,766 B2 * | 10/2010 | Ludvig et al. .................... | 725/38 |
| 7,979,800 B2 * | 7/2011 | Hoshino et al. ................ | 715/719 |
| 8,332,889 B2 * | 12/2012 | Calzone ........................... | 725/43 |
| 8,341,539 B2 * | 12/2012 | Matsuzawa et al. .......... | 715/765 |
| 2003/0149988 A1 * | 8/2003 | Ellis et al. ........................ | 725/87 |
| 2003/0212995 A1 * | 11/2003 | Kitamori ......................... | 725/41 |
| 2004/0098746 A1 * | 5/2004 | Lee et al. ........................ | 725/80 |
| 2005/0193418 A1 * | 9/2005 | Miyabayashi ................... | 725/68 |
| 2006/0024029 A1 * | 2/2006 | Yamashita et al. ............. | 386/83 |
| 2006/0064716 A1 * | 3/2006 | Sull et al. ........................ | 725/37 |
| 2006/0143651 A1 * | 6/2006 | Kim ............................... | 725/39 |

(Continued)

FOREIGN PATENT DOCUMENTS

| | | |
|---|---|---|
| JP | 2003-169263 | 6/2003 |
| JP | 2004-166044 | 6/2004 |
| KR | 2006-133416 A | 12/2006 |
| KR | 2007-75731 A | 7/2007 |

*Primary Examiner* — Pinkal R Chokshi
(74) *Attorney, Agent, or Firm* — NSIP Law

(57) ABSTRACT

An apparatus and method to display channel information in a digital broadcasting receiver. The apparatus includes a first tuner to receive a signal of one of the plurality of channels, a plurality of second tuners to extract channel information and a representative image for each of the plurality of channels from a broadcasting signal during reception of the signal of the selected channel by the first tuner, and a display to display the channel information and the representative image for each channel when requested by the user.

26 Claims, 5 Drawing Sheets

(56) References Cited

U.S. PATENT DOCUMENTS

| | | | |
|---|---|---|---|
| 2007/0204291 A1* | 8/2007 | Ichihashi | 725/33 |
| 2008/0184327 A1* | 7/2008 | Ellis et al. | 725/134 |
| 2010/0128183 A1* | 5/2010 | Ishii | 348/726 |
| 2012/0042342 A1* | 2/2012 | Shanks et al. | 725/41 |
| 2012/0072952 A1* | 3/2012 | Vaysman et al. | 725/40 |
| 2012/0098979 A1* | 4/2012 | Takanezawa | 348/207.1 |

* cited by examiner

| CHANNEL NUMBER | CHANNEL NAME | BROADCAST NAME | ... |
|---|---|---|---|
| 2 | SHOPPING | PROGRAM #2 | ... |
| ... | ... | ... | ... |
| 7 | KBS2 | PROGRAM #7 | ... |
| ... | ... | ... | ... |
| 18 | XTM | PROGRAM #18 | ... |
| ... | ... | ... | ... |
| 24 | YTN | PROGRAM #24 | ... |
| ... | ... | ... | ... |
| 28 | CNC | PROGRAM #28 | ... |

APPARATUS AND METHOD FOR DISPLAYING CHANNEL INFORMATION IN DIGITAL BROADCASTING RECEIVER

CROSS-REFERENCE TO RELATED APPLICATION

This application claims the benefit of Korean Patent Application No. 2008-13063 filed in the Korean Intellectual Property Office on Feb. 13, 2008, the disclosure of which is incorporated herein by reference.

BACKGROUND OF THE INVENTION

1. Field of the Invention

Aspects of the present invention relate to a digital broadcasting receiver, and more particularly, to an apparatus and method to display channel information in a digital broadcasting receiver, in which the apparatus utilizes a plurality of tuners.

2. Description of the Related Art

Digital Multimedia Broadcasting (DMB) is an area of technology that has been receiving much attention in recent times. DMB, as in the case of Digital Audio Broadcasting, involves broadcasting a plurality of programs in a single carrier frequency. DMB refers to broadcasting services in which broadcasting signals are sent via satellite or terrestrial relay stations such that users, even when outdoors or in motion, are able to watch or listen to various multimedia (video, audio, data, etc.) broadcasts through multiple channels using portable or vehicle receivers equipped with omnidirectional antennas. DMB utilizes long band (L-Band) in the 1452-1492 MHz range or short band (S-Band) in the 2310-2360 MHz or 2535-2655 MHz range in order to provide mobile services that are differentiated from existing fixed receiver radio broadcasting. Although most land areas can directly receive DMB broadcasts, areas outside the line of sight (LOS) of the satellites receive DMB broadcasts using gap filters. Even when the user is in motion, services that may be received include various multimedia services such as those associated with multichannel audio broadcasts, traffic information, vehicle position information, and weather information.

Since a number of programs are included in a predetermined carrier frequency in DMB, to select a program, a user must first select a carrier frequency, after which the user selects the desired program from among the number of programs included in the corresponding carrier frequency. Further, when the user searches for a program that he or she desires to watch, the user must first know beforehand which programs are included in the carrier frequency that includes the desired program. Since there are limits to the user being able to memorize the multitude of programs and their corresponding carrier frequencies, there is a need for a function that allows for easy checking of all the channels of a received broadcasting signal.

Typically, a digital broadcasting receiver has an auto channel tuning function to automatically tune the various broadcasting channels. Accordingly, each broadcasting channel is automatically scanned and tuning information of detected broadcasting signals is stored and managed as channel information in the receiver. The user may then select the desired broadcasting channel. However, with the widespread use of new broadcasts (e.g., cable broadcasting) and the sharp increase in the number of broadcasting channels in recent times, users must spend a significant amount of time in selecting a desired broadcasting channel.

Furthermore, when performing auto channel tuning with the conventional receiver, a representative image for each broadcasting channel is captured and then stored and managed in the device. At the request of the user, one or more reduced images are output together with the channel information stored in the device. However, with the conventional receiver, if there is a significant difference in time between when auto channel tuning is performed and the present time, or if there is no particular distinguishing picture at the instant that the representative image is captured, the collected representative images are unable to sufficiently describe the contents of the channels to which they are associated. Accordingly, there is a need for a channel information display method that allows users to easily select channels.

SUMMARY OF THE INVENTION

Aspects of the present invention provide an apparatus and method to display channel information in a digital broadcasting receiver, in which a broadcast is watched through a first tuner, and at the same time, channels are continuously searched using a second tuner, such that a representative image for each channel that is close to a real-time image is provided to a user to thereby enhance convenience in channel selection.

According to an aspect of the present invention, an apparatus to display channel information of a plurality of channels in a digital broadcasting receiver that receives a broadcasting signal. The apparatus includes: a first tuner to receive a signal of one of the plurality of channels selected by a user; a plurality of second tuners to extract channel information and a representative image for each of the plurality of channels from the broadcasting signal during reception of the signal of the selected channel by the first tuner; and a display to display the channel information and the representative image for each channel when the user makes a corresponding request.

According to another aspect of the present invention, a method of displaying channel information of a plurality of channels in a digital broadcasting receiver is provided. The method includes: receiving a broadcasting signal; receiving a signal of one of the plurality of channels selected by a user through a first tuner and simultaneously extracting channel information and a representative image for each of the plurality of channels from the broadcasting channel through a plurality of second tuners; and displaying the channel information and the representative image for each channel when the user makes a corresponding request.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
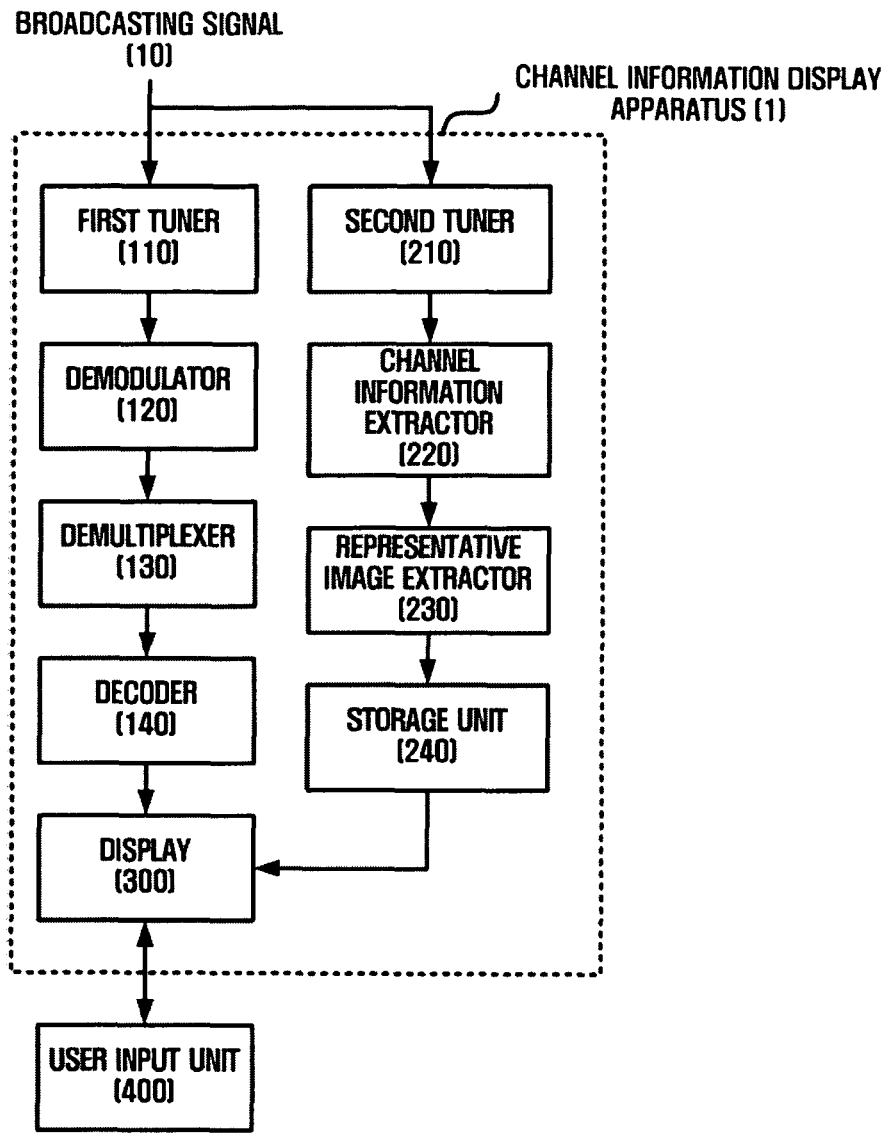
FIG. 1 is a block diagram of an apparatus to display channel information in a digital broadcasting receiver according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention are described hereinafter with reference to block diagrams and flowchart illustrations. It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, implement the operations specified in the flowchart block or blocks. These computer program instructions may also be stored in a computer usable or computer-readable memory that can direct a computer or other programmable data processing apparatus to operate in a particular manner, such that the instructions stored in the computer usable or computer-readable memory produce an article of manufacture including instructions to implement the operations specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the operations specified in the flowchart block or blocks.

Further, each block of the flowchart illustrations may represent a module, segment, or portion of code, which comprises one or more executable instructions to implement the specified logical operation(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

FIG. 1 shows an apparatus 1 to display channel information in a digital broadcasting receiver according to an embodiment of the present invention. The apparatus 1 includes a first tuner 110, a plurality of second tuners 210, a channel information extractor 220, a representative image extractor 230, a storage unit 240, and a display 300. According to other aspects of the present invention, the apparatus 1 may include additional and/or different units. Similarly, the functionality of two or more of the above units may be integrated into a single component.

A tuner may function to select a specific frequency range from radio frequency (RF) signals sent from a transmission end to thereby extract a frequency signal, such that data of a desired broadcasting channel are received. In an embodiment of the present invention, a plurality of tuners may include the first tuner 110 to receive a signal of a channel selected by a user, and the plurality of second tuners 210 which, during reception of the signal of the channel selected by the user by the first tuner 110, extracts channel information and a representative image for each channel from a broadcasting signal 10.

The first tuner 110 receives a frequency corresponding to the channel selected by the user to thereby allow the user to watch the broadcast of the corresponding channel. Accordingly, although the apparatus 1 includes one first tuner 110 as shown in FIG. 1, aspects of the present invention are not limited in this respect. In addition, as used herein, "watch" refers to actions that are performed with respect to all forms of multimedia, namely, radio, television, datacasting, etc., such as listening, watching, viewing, and the like.

To allow watching the channel selected using the first tuner 110, the apparatus 1 may include a demodulator 120, a demultiplexer 130, and a decoder 140. The demodulator 120 performs demodulation of a signal received through the channel selected using the first tuner 110 to thereby extract a transport stream. The demultiplexer 130 separates data of audio, video, and additional information that are multiplexed in units of packets in the transport stream received from the demodulator 120. The decoder 140 decodes an element stream separated by the demultiplexer 130. Since processes of extracting and reproducing broadcasting data of a specific channel from the broadcasting signal 10 is well known, a detailed description thereof will be omitted herein.

The second tuners 210 extract channel information and a representative image for each channel from the broadcasting signal 10. The process of extracting channel information and a representative image for each channel in the second tuner 210 may take place while the signal of the channel selected by the user is received and broadcast in the first tuner 110. This is described in greater detail below.

The plurality of second tuners 210 may include one or more second tuner 210. The number of second tuners 210 may be determined according to the total number of channels, the reproduction time of the representative images extracted by the representative image extractor 230, the conversion time of each channel, etc. For purposes of illustration, an example is described in the following by which there is one second tuner 210 included in the apparatus 1.

The channel information extractor 220 determines whether channel information of a specific channel is included in the broadcasting signal 10. If channel information of the specific channel is included in the broadcasting signal 10, the channel information extractor 220 extracts channel information of the specific channel.

The representative image extractor 230 extracts a representative image with respect to the specific channel when channel information of the specific channel is included in the broadcasting signal 10. Although not shown in FIG. 1, similar to the first tuner 110 as described above, the representative image extractor 230 may include a demodulator to perform demodulation of a signal received through a channel searched by the second tuner 210 to thereby extract a transport stream, a demultiplexer to separate data of audio, video, and additional information that are multiplexed in units of packets in the transport stream received from the demodulator, and a decoder to decode an element stream separated by the demultiplexer.

The storage unit 240 stores channel information and information of representative images extracted from the channel. In the case where a plurality of the second tuners 210 are included in the apparatus 1, one storage unit 240 may be provided for each of the second tuners 210. Alternatively, one storage unit 240 may be provided for all of the plurality of second tuners 210. As yet another alternative, the plurality of second tuners 210 may be grouped together into a plurality of groups and one storage unit 240 may be provided for each group.

The storage unit 240 may be a module that allows for information input and output such as a hard disk, a flash memory, a CF (Compact Flash) card, an SD (Secure Digital) card, an SM (Smart Media) card, an MMC (Multimedia Card), or memory stick, and may be installed in a personal font generator or included in a separate device.

The display 300 reproduces a broadcast of a channel selected by the user, or when requested by the user, displays channel information and a representative image for each channel. The display 300 is able to display the channel information and representative image for each channel in a mosaic pattern format. In the present context, a mosaic refers to the simultaneous display of channel information and representative images for a plurality of channels in separate blocks. The display 300 may also be able to display the channel information and representative image for each channel in a multiple picture-in-picture (PIP) format. Multiple PIP refers to showing in real time one channel on the main screen and simultaneously displaying the remaining channels in small sub-screens. These formats are not limiting; according to other aspects of the present invention, the display 300 may display the channel information and representative image in other formats. The display 300 may be, for example, a CRT (Cathode-Ray Tube), an LCD (Liquid Crystal Display), an LED (Light-Emitting Diode) display, an OLED (Organic Light-Emitting Diode) display, or a PDP.

The user input unit 400 receives user input of channel selection, channel information display requests, etc. User input through the user input unit 400 may be realized through a touchscreen panel included in the display 300, or may be realized using an external input device such as a remote control, mouse, keyboard, microphone, etc. The user input unit 400 is not limited in these respects, and may take various forms as may be contemplated by those skilled in the art.

Although not shown in FIG. 1, the apparatus 1 may include a controller to control the operations of the first tuner 110, the plurality of the second tuners 210, the channel information extractor 220, the representative image extractor 230, the storage unit 240, and the display 300.

Figure 2:
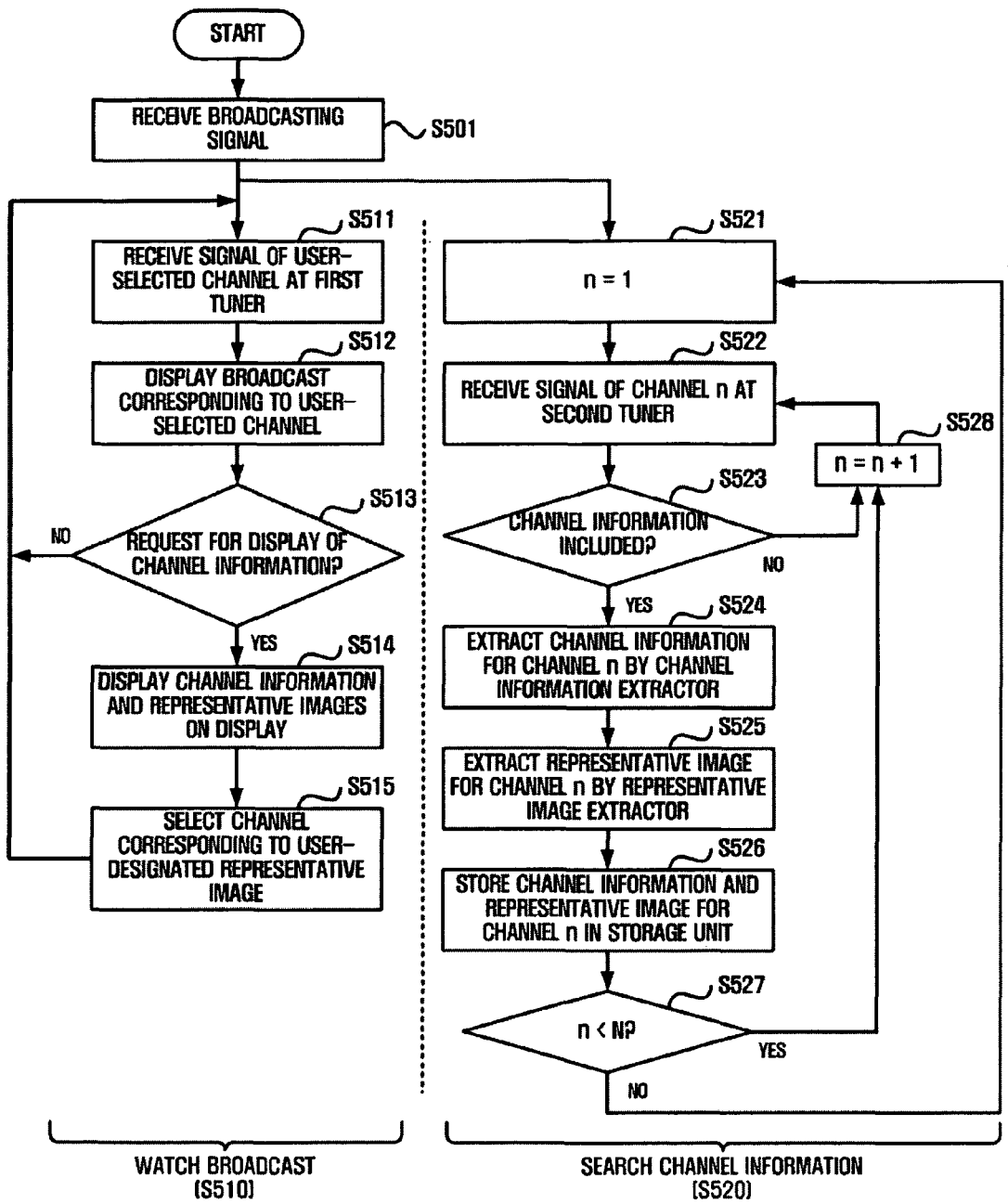
FIG. 2 is a flowchart of a process of displaying channel information in a digital broadcasting receiver according to an embodiment of the present information.

A process of displaying channel information in a digital broadcasting receiver according to an embodiment of the present invention and which is implemented utilizing each of the modules of the apparatus 1 will now be described. FIG. 2 is a flowchart of a process of displaying channel information in a digital broadcasting receiver according to an embodiment of the present information. In the following example, N denotes the total number of channels in the broadcasting signal 10, and it is assumed that there is one first tuner 110 and one second tuner 210.

In operation S501, the broadcasting signal 10 is received through the first tuner 110 and the second tuner 210. The user may watch the broadcast that he or she selects through the first tuner 110 in operation S510. For this purpose, the first tuner 110 receives a signal of a channel selected by the user from the broadcasting signal 10 in operation S511. The display 300 displays the broadcast corresponding to the channel selected by the user in operation S512. To achieve such display, the demodulator 120 first demodulates the signal received through the first tuner 110 to thereby extract a transport stream, the demultiplexer 130 subsequently separates data of audio, video, and additional information multiplexed in units of packets in the transport stream received from the demodulator 120, and the decoder finally decodes an element stream separated by the demultiplexer 130 to thereby reproduce the broadcast of the channel selected by the user. The broadcast reproduced in this manner is continuously performed until a channel information display request is received from the user ("No" of operation S513).

While the signal of the channel selected by the user is received through the first tuner 110 and broadcast in operation S510, channel information with respect to all channels included in the broadcasting signal 10 is sequentially searched in the second tuner 210 in operation S520. The second tuner 210 first receives a signal with respect to channel 1 in operations S521 and S522, and determines if channel information for channel 1 is included in the received broadcasting signal 10 in operation S523. If there is channel information for channel 1 included in the broadcasting signal 10 ("Yes" of operation S523), the channel information extractor 220 extracts channel information for channel 1 in step S524. The representative image extractor 230 then extracts a representative image of channel 1 in operation S525.

Figures 3, 4:
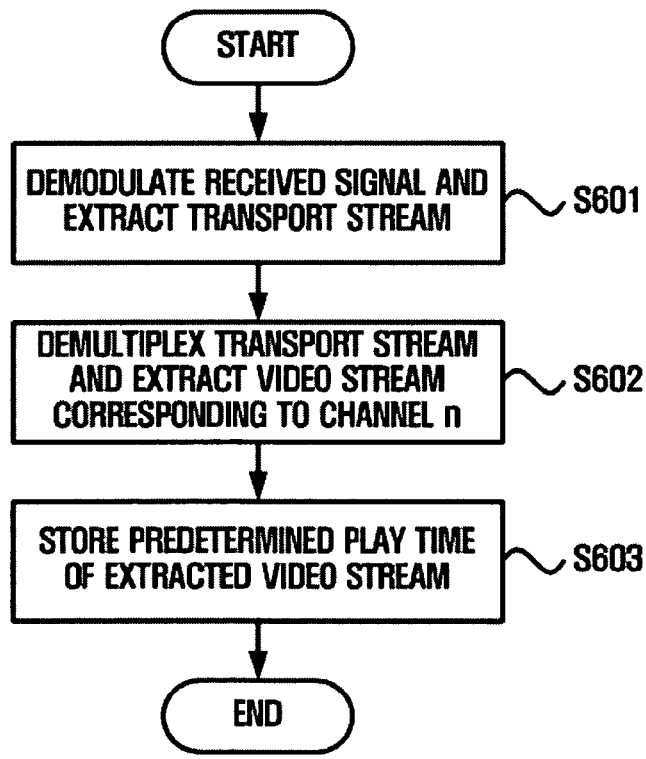
FIG. 3 is a table illustrating an example of channel information for specific channels extracted by a channel information extractor of the apparatus of FIG. 1.
FIG. 4 is a flowchart of an example process of extracting representative images for a specific channel by a representative image extractor of the apparatus of FIG. 1.

FIG. 3 is a table showing an example of channel information for specific channels extracted by the channel information extractor 220. As shown in FIG. 3, channel information for specific channels may include one or more of (i.e., at least one of) a channel number, a channel name, a broadcast name, a broadcast time, etc. However, aspects of the present invention are not limited in this regard.

FIG. 4 is a flowchart of an example process of extracting a representative image for a specific channel by the representative image extractor 230. The apparatus 1 may use a video stream or a video clip (both referred to hereinafter as a video stream) that is in a moving picture format for the representative image of the specific channel. Accordingly, the user is able to more easily ascertain the content of the broadcast of the corresponding channel than if the user were shown a still image captured from the broadcast as the representative image.

First, in operation S601, the representative image extractor 230 demodulates the received signal to thereby extract a transport stream. In operation S602, the representative image extractor 230 demultiplexes the extracted transport stream to thereby extract a video stream corresponding to the specific channel. Finally, in operation S603, the representative image extractor 230 stores a predetermined play time of the extracted video stream in the storage unit 240.

The storage time of the video stream (i.e., the amount of play time of the extracted video stream that is stored) may be established based on the search time for all the channels. The search time for all the channels (total channel search time) may be determined by the following Equation 1.

$$\text{total channel search time} = \text{total number of channels} \times (\text{storage time for each video stream} + \text{channel conversion time}) \quad \text{[Equation 1]}$$

As is evident from Equation 1, while the user is able to more easily determine the content of the corresponding channel if the storage time for the video stream is lengthened, the results in the search time for all the channels increases such that the search speed is reduced. Accordingly, the storage time for the video stream is established taking into consideration the total number of channels N, channel conversion time, and search time for all the channels.

Referring again to FIG. 2, after the channel information and representative image for channel n are extracted by the channel information extractor 220 and the representative image extractor 230, the extracted channel information and representative image are stored in the storage unit 240 in operation S526. As shown in FIG. 2, storage of the channel information and representative image in the storage unit 240 is performed after extracting the channel information and the representative image for each channel. However, as an alternative, storage in the storage unit 240 may be performed at one time after the extraction of the channel information and representative images for all the channels has been completed. The number of storage units 240 may also be varied as described above.

Finally, in operation S527, whether channel information searching for all the channels in the broadcasting signal 10 has been performed is determined. If channel information searching for all the channels in the broadcasting signal 10 has not been performed ("Yes" of operation S527), n is incremented by one in step S528 and searching is performed for the subsequent channel starting from step S522. However, if channel information searching for all the channels in the broadcasting signal 10 has been performed, searching is performed for all the channels starting from channel 1 in operation S521.

Figure 5:
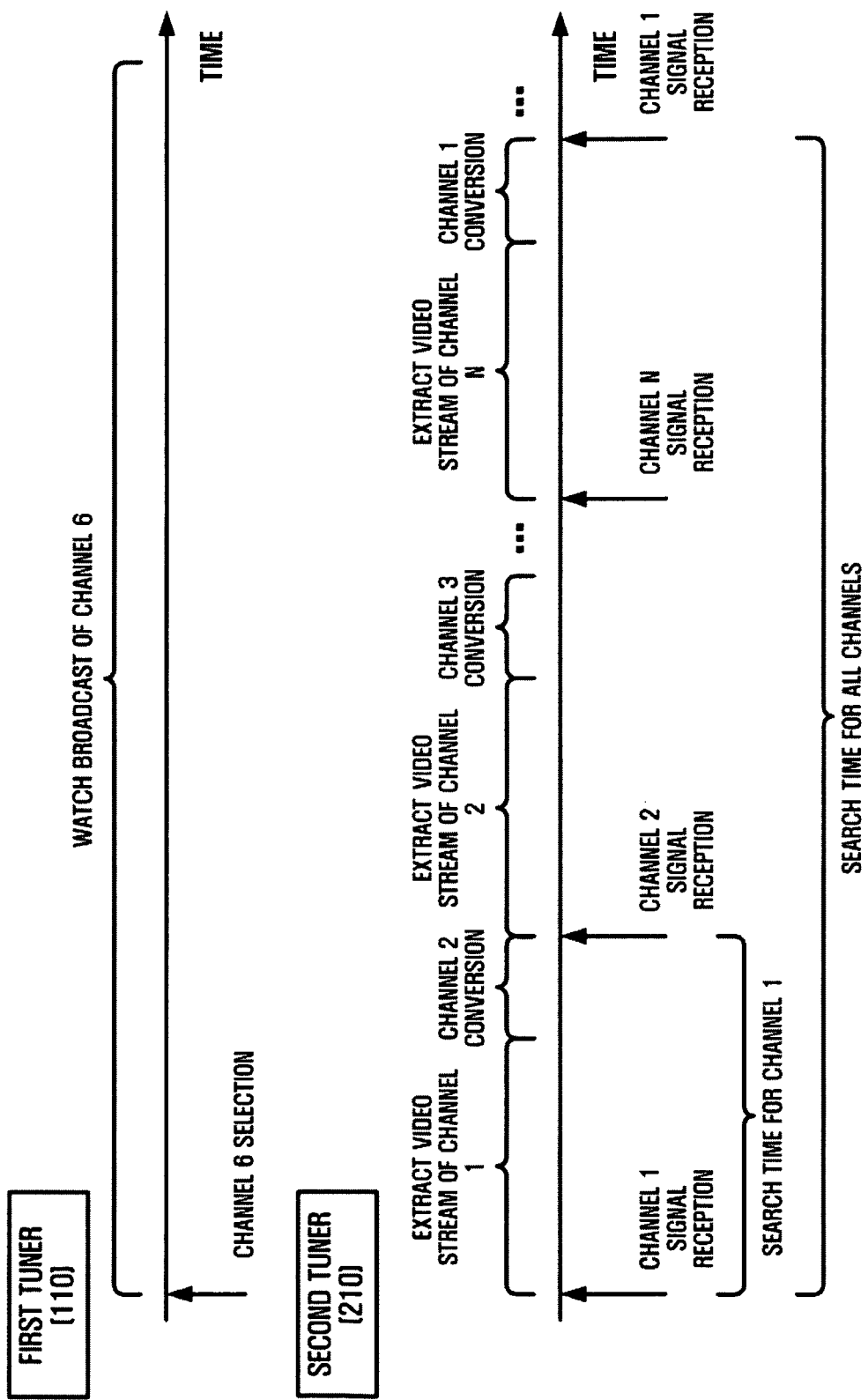
FIG. 5 illustrates an example of the operations of a first tuner and a second tuner of the apparatus of FIG. 1.

FIG. 5 shows an example of the operations of the first tuner 110 and the second tuner 210 of the apparatus 1. As shown in FIG. 5, the broadcast of channel 6 selected by the user is watched through the first tuner 110. At the same time, the second tuner 210 continuously repeats searching of channel information for all the channels in the background, such that channel information searching for all the channels is performed. The search time for channel n may refer to the time required to receive the signal of channel n, extract channel information and representative image, and store the channel information and representative image in the storage unit 240 (operations S522 to S526 in FIG. 2). However, since the time required for receiving the signal of channel n, extracting the channel information, and storing the channel information and representative image may be ignored, the search time for channel n may be regarded as being equal to the time required to extract the video stream for channel n (i.e., the video stream storage time) plus the time required to convert to the next channel. This is reflected in Equation 1, which includes only these two parameters in calculating search time.

Although only one second tuner 210 is shown in FIG. 5, there may be two or more second tuners 210 to search all the channels. For example, if there are X second tuners 210 and N total channels that are searched, the channels may be grouped together in X of groups, and each of the groups of the channels may be searched by one of the second tuners 210. So, for this example, if there are three second tuners 210 (i.e., first, second, and third second tuners 210) and 30 channels (i.e., channels 1 to 30) to be searched, the first second tuner 210 searches channels 1 to 10, the second second tuner 210 searches channels 11 to 20, and the third second tuner 210 searches channels 21 to 30. Aspects of the present invention are not limited to such a process by which all the channels are searched by a plurality of second tuners 210, and the ratio between the number of channels and the second tuners 210 may be changed in various ways as may be contemplated by those skilled in the art.

Referring back to FIG. 2, while the user is watching the channel that he or she selected, if the user requests the display of channel information ("Yes" of operation S513), the channel information and representative images searched in the second tuner 210 may be displayed on the display 300 in operation S514. This may be performed by discontinuing the reproduction of the image of the channel selected by the user and displaying the channel information and representative images of all the channels on the display 300.

Figure 6:
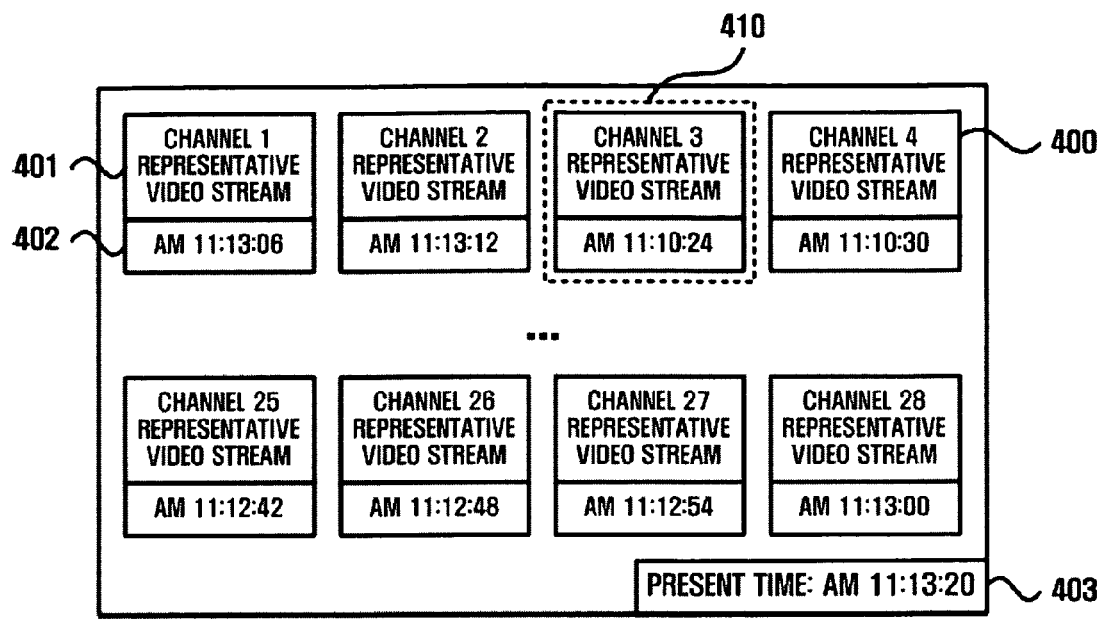
FIG. 6 is a diagram illustrating an example display screen of channel information and representative images for all channels appearing on a display of the apparatus of FIG. 1.

FIG. 6 shows an example display screen of channel information and representative images for all the channels appearing on the display 300 of the apparatus 1. The display 300 may display channel information and a representative image for each of the channels obtained from the storage unit 240. To allow the channel information and representative images for all the channels to be displayed on the display 300, the channel information and representative images for the channels may be displayed in a mosaic pattern format on the display 300 as shown in FIG. 6.

The time 402 at which the representative image 401 for each channel was extracted may be displayed together with the representative image thereof to realize a total image 410 for each channel. Further, the present time 403 may be displayed on the display 300. Accordingly, the user may compare the present time 403 with the time 402 at which the representative image 401 was extracted for each channel to thereby easily determine the difference in time therebetween. Although not shown in FIG. 6, channel information for each channel may also be displayed on the display 300.

As described above, since a video stream that is in a moving picture format is used for the representative image for a specific channel, a video stream for each of the channels is reproduced on the display 300. Even if the video stream reproduced for each channel is not a real-time image of what is presently being broadcast, since the maximum time lag for the representative image for the channel that was being last searched when the user made the request is approximately equal to the time needed to search all the channels, such an image nevertheless is sufficient to aid the user in selecting a desired channel. This is described in greater detail below.

Figure 7:
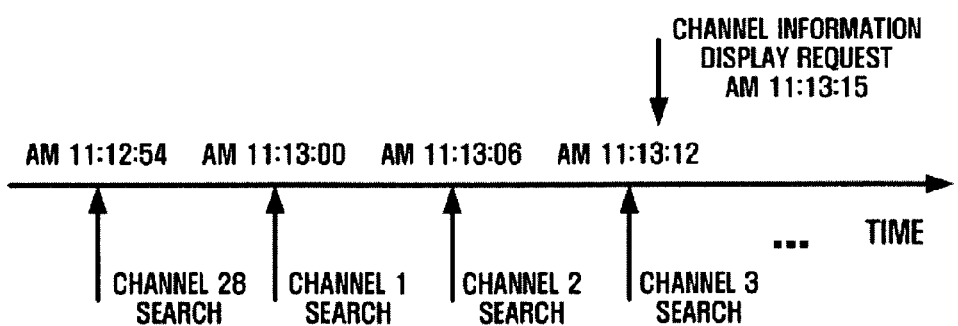
FIG. 7 is a diagram illustrating an example of extracting times for channel information and representative images appearing on the display of the apparatus of FIG. 1.

FIG. 7 shows an example of extracting times for channel information and representative images appearing on the display 300 of the apparatus 1. The following assumptions are made for this example: The total number of channels is 28. The time required to extract a video stream for channel n (i.e., the storage time for the video stream) is 4 seconds. The time required to convert from channel n to the next channel is 2 seconds. The time required to search for one channel n is 6 seconds. The total search time is 168 seconds (e.g., 2 minutes and 48 seconds).

Referring to FIG. 7, assuming all the channels have been searched in the second tuner 210 and the time at which searching is completed for channel 28 is 11:12:54 a.m., if the user makes a request for the display of channel information at 11:13:15 a.m., at the instant the user makes the request for the display of channel information, searching has been completed for channel 2 and a video stream of channel 2 is stored from between 11:13:06 a.m. and 11:13:12 a.m.

Accordingly, video streams for channel 1 and 2 extracted in the present search operation of all the channels, and video streams for channels 3 to 28 extracted in the previous search operation of all the channels, are displayed on the display 300. Here, the representative image extracted at a time furthest from the time at which the user has made the request for the display of representative images (11:13:15 a.m.) is that for channel 3 which was extracted at 11:10:24 a.m. Hence, the maximum time lag for the representative image for the channel that was being last searched when the user made the request is approximately equal to the time it takes to search all the channels (2 minutes and 48 seconds plus the time between the time of the request and when searching for the channel that was last being searched began).

Referring back to FIG. 2, if the user designates the representative image of the channel that he or she desires to watch through the user input unit 400, the channel corresponding to the designated representative image is selected in operation S515. Next, the first tuner 110 receives the signal for the selected channel such that the broadcast for the corresponding channel is reproduced on the display 300 in operations S511 and S512. Further, the second tuner 210 continuously repeats searching of the channel information for all the channels in the background.

In the apparatus to display channel information in a digital broadcasting receiver according to aspects of the present invention described above, the process of extracting channel information and representative images in the second tuner may be realized during reception of the signal of the user-selected channel by the first tuner. Accordingly, a broadcast is watched through the first tuner and, at the same time, searching of the channels takes place using the second tuner such that representative images that lag minimally from the actual time may be provided to the user, thereby enhancing convenience in selecting channels. Further, since the user is able to check the channel information for a plurality of channels on a single display screen, channel searching may be performed more quickly and accurately. In addition, since representative images are provided in a video stream format, the user may more easily determine what is actually being broadcast for each channel.

The apparatus 1 may be used in various types of digital broadcasting receivers, such as those in digital televisions, digital set-top boxes, and mobile devices (including mobile phones, personal digital assistants, and personal entertainment devices).

The terms "unit," "module," etc., used herein, may be, but are not limited to, a software or hardware component, such as a Field Programmable Gate-Array (FPGA) or Application-Specific Integrated Circuit (ASIC), which performs certain tasks. A unit, module, etc., may advantageously be configured to reside on the addressable storage medium and be configured to execute on one or more processors. Thus, a unit, module, etc., may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units, modules, etc., may be combined into fewer components and units, modules, etc., or further separated into additional components and units, modules, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to display channel information of a plurality of channels in a digital broadcasting receiver that receives a broadcasting signal, the apparatus comprising:
   a first tuner to receive a signal of one of the plurality of channels selected by a user;
   a plurality of second tuners to extract channel information and a representative image for each of the plurality of channels from the broadcasting signal during reception of the signal of the user-selected channel by the first tuner; and
   a display to display the channel information and the representative image for each channel when the user makes a corresponding request,
   wherein the plurality of the second tuners continuously repeats the extraction of channel information and the representative images included in the broadcast signal for all the channels in the background, and
   wherein the display displays an extraction time of the channel information and the representative image for each channel together with a present time, and
   wherein the extraction of the extraction time occurs for a predefined time period from the present time, where the predefined time period is a maximum time lag to search for the representative image for each of the channel.

2. The apparatus of claim 1, further comprising:
   a channel information extractor to determine whether channel information for a specific channel is included in the broadcasting signal, and to extract the channel information for the specific channel when the channel information is included in the broadcasting signal; and
   a representative image extractor to extract a representative image with respect to the specific channel if the channel information for the specific channel is included in the broadcasting signal.

3. The apparatus of claim 2, wherein the representative image extractor performs demultiplexing of a transport stream of an image frame received through the specific channel, and extracts a predetermined play time of a video stream from the demultiplexed transport stream.

4. The apparatus of claim 3, wherein the representative image extractor stores the extracted video stream.

5. The apparatus of claim 1, wherein the channel information for each channel includes at least one of a channel number, a channel name, a broadcast name, and a broadcast time.

6. The apparatus of claim 1, wherein the display displays the channel information and the representative image for each channel in a mosaic pattern format.

7. The apparatus of claim 1, wherein the display displays the channel information and the representative image for each channel in a picture-in-picture format.

8. The apparatus of claim 1, wherein, if channel information for a specific channel is selected from among the displayed channel information and the representative image for each channel, the first tuner receives the specific channel corresponding to the specific channel information and the display displays the specific channel.

9. A method of displaying channel information of a plurality of channels in a digital broadcasting receiver, the method comprising:
   receiving a broadcasting signal;
   receiving a signal of one of the plurality of channels selected by a user through a first tuner and simultaneously extracting channel information and a representative image for each of the plurality of channels from the broadcasting channel through a plurality of second tuners; and
   displaying the channel information and the representative image for each channel when the user makes a corresponding request,
   wherein the extracting of the channel information and the representative images for all the channels included in the broadcasting signal is continuously repeated in the background, and wherein an extraction time of the channel information and the representative image for each channel are displayed together with a present time, and wherein the extraction of the extraction time occurs for a predefined time period from the present time, where the predefined time period is a maximum time lag to search for the representative image for each of the channel.

10. The method of claim 9, wherein the extracting of the channel information and the representative image for each channel comprises:

determining if channel information for a specific channel is included in the broadcasting signal;

extracting a representative image for the specific channel if the channel information for the specific channel is included in the broadcasting signal; and repeating the determining if the channel information for the specific channel is included in the broadcasting signal and the extracting of the representative image for all the channels included in the broadcasting signal.

11. The method of claim 10, wherein the extracting of the representative image comprises:

performing demultiplexing of a transport stream of an image frame received through the specific channel; and extracting a predetermined play time of a video stream from the demultiplexed transport stream.

12. The method of claim 11, wherein the extracting of the representative image further comprises storing the extracted video stream.

13. The method of claim 9, wherein the channel information for each channel includes at least one of a channel number, a channel name, a broadcast name, and a broadcast time.

14. The method of claim 9, wherein the channel information and the representative image for each channel are displayed in a mosaic pattern format.

15. The method of claim 9, wherein the channel information and the representative image for each channel are displayed in a picture-in-picture format.

16. The method of claim 9, further comprising:

receiving through the first tuner a channel corresponding to specific channel information; and displaying the specific channel if channel information for a specific channel is selected from among the displayed channel information and the representative image for each channel.

17. A non-transitory computer readable medium comprising instructions that, when read by a computer, cause the computer to perform the method of claim 9.

18. A digital broadcasting receiver to receive a broadcasting signal having a plurality of channels, the receiver comprising:

at least one first tuner to receive a signal of a selected channel of the plurality of channels selected by the user;

at least one second tuner to extract channel information and a representative image for each of the plurality of channels from the broadcasting signal while the at least one first tuner receives the signal of the selected channel;

a display to display the selected channel received by the at least one first tuner and to display the representative images for the each of the plurality of channels extracted by the at least one second tuner; and a controller to control the display to display the representative images based upon input from the user, wherein the at least one second tuner continuously repeats the extraction of channel information and the representative images included in the broadcast signal for all the channels in the background, and wherein the display displays an extraction time of the channel information and the representative image for each channel together with a present time, and wherein the extraction of the extraction time occurs for a predefined time period from the present time, where the predefined time period is a maximum time lag to search for the representative image for each of the channel.

19. The digital broadcasting receiver of claim 18, wherein:

the at least one second tuner repeatedly extracts the channel information and the representative image for the each of the plurality of channels; and the controller controls the display to display, for each of the plurality of channels, the corresponding representative image most recently extracted by the at least one second tuner.

20. The digital broadcasting receiver of claim 18, wherein the representative image comprises a video clip.

21. The digital broadcasting receiver of claim 18, further comprising:

at least one storage unit to store the channel information and the representative image for the each of the plurality of channels.

22. The digital broadcasting receiver of claim 18, wherein the controller controls the display to display the channel information for the each of the channels along with the representative image, based upon input from the user.

23. The digital broadcasting receiver of claim 18, wherein, if the user selects a particular channel while the display is displaying the representative images of the each of the plurality of channels, the controller controls the first tuner to receive a signal of the particular channel selected by the user.

24. The apparatus of claim 1, wherein a number of the plurality of channels is greater than a number of the plurality of second tuners.

25. A digital broadcasting receiver to receive a broadcasting signal having a plurality of channels, the receiver comprising:

at least one first tuner to receive a signal of a selected channel of the plurality of channels selected by the user;

at least one second tuner to extract channel information and a representative image for ones of the plurality of channels from the broadcasting signal while the at least one first tuner receives the signal of the selected channel;

a display to display the selected channel received by the at least one first tuner and to display the representative images for the ones of the plurality of channels extracted by the at least one second tuner; and a controller to control the display to display the representative images based upon input from the user, wherein each second tuner is capable of extracting the channel information and the representative image for more than one channel while the at least one first tuner receives the signal of the selected channel, wherein the at least one second tuner continuously repeats the extraction of channel information and the representative images included in the broadcast signal for all the channels in the background, wherein the display displays an extraction time of the channel information and the representative image for each channel together with a present time, and wherein the extraction of the extraction time occurs for a predefined time period from the present time, where the predefined time period is a maximum time lag to search for the representative image for each of the channel.

26. The apparatus of claim 1, wherein the plurality of second tuners extracts the channel information and the representative image for each of the plurality of channels in a sequential order of the channels.

* * * * *